(12) United States Patent
Okubo (10) Patent No.: US 10,371,334 B2
(45) Date of Patent: Aug. 6, 2019

(54) VEHICLE LAMP

(71) Applicant: Ichikoh Industries, Ltd., Isehara-shi (JP)

(72) Inventor: Yasuhiro Okubo, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 0 days.

(21) Appl. No.: 15/774,764

(22) PCT Filed: Nov. 10, 2016

(86) PCT No.: PCT/JP2016/083447
§ 371 (c)(1),
(2) Date: May 9, 2018

(87) PCT Pub. No.: WO2017/082371
PCT Pub. Date: May 18, 2017

(65) Prior Publication Data
US 2018/0328558 A1 Nov. 15, 2018

(30) Foreign Application Priority Data
Nov. 10, 2015 (JP) .................. 2015-220772

(51) Int. Cl.
*B60Q 1/04* (2006.01)
*F21S 41/00* (2018.01)
(Continued)

(52) U.S. Cl.
CPC .............. *F21S 41/143* (2018.01); *B60Q 1/04* (2013.01); *F21S 41/00* (2018.01); *F21S 41/147* (2018.01);
(Continued)

(58) Field of Classification Search
CPC ............................................. F21S 41/25–275
See application file for complete search history.

(56) References Cited

U.S. PATENT DOCUMENTS 9,939,127 B2 * 4/2018 Uchida .................. F21V 5/008
2002/0024818 A1 * 2/2002 Kondo .................. F21V 7/0091
362/516
(Continued)

FOREIGN PATENT DOCUMENTS

| JP | 5-266701 A | 10/1993 |
|---|---|---|
| JP | 2013-51166 A | 3/2013 |
| JP | 2014-164876 A | 9/2014 |

OTHER PUBLICATIONS

International Search Report dated Feb. 21, 2017 in PCT/JP2016/083447 filed Nov. 10, 2016.

*Primary Examiner* — Mariceli Santiago
(74) *Attorney, Agent, or Firm* — Oblon, McClelland, Maier & Neustadt, L.L.P.

(57) ABSTRACT

A vehicle lamp is provided with: a semi-conductor-type light source; a second lens having an incident surface in which two convex sections protruding toward the light source side on the outer side in the horizontal direction from the center are connected at the center side to form a portion on the center side which is recessed on the inner side; and a first lens that is disposed between the light source and the second lens and irradiates the second lens with the light from the light source such that a spread of light from the light source is converted to a spread entering the incident surface of the second lens and a diffused light distribution pattern irradiated on the vehicle front side spreads outward in the vehicle horizontal direction.

10 Claims, 8 Drawing Sheets

(51) Int. Cl.
  *F21S 43/00*    (2018.01)
  *F21S 41/143*   (2018.01)
  *F21S 41/147*   (2018.01)
  *F21S 41/255*   (2018.01)
  *F21S 41/275*   (2018.01)
  *F21Y 115/10*   (2016.01)

(52) U.S. Cl.
  CPC ........... *F21S 41/255* (2018.01); *F21S 41/275* (2018.01); *F21S 43/00* (2018.01); *B60Q 2200/30* (2013.01); *F21Y 2115/10* (2016.08)

(56) References Cited

U.S. PATENT DOCUMENTS

| | | | |
|---|---|---|---|
| 2007/0291499 A1* | 12/2007 | Tanaka | F21S 41/255 362/509 |
| 2008/0080207 A1* | 4/2008 | Specht | F21S 41/143 362/581 |
| 2013/0051056 A1 | 2/2013 | Okubo | |
| 2013/0163269 A1* | 6/2013 | Abe | B60Q 1/04 362/520 |
| 2016/0201868 A1* | 7/2016 | Hayashi | F21S 41/143 362/520 |
| 2016/0281947 A1* | 9/2016 | Shim | F21S 41/255 |
| 2018/0106445 A1* | 4/2018 | Okubo | F21S 41/192 |

* cited by examiner

VEHICLE LAMP

TECHNICAL FIELD

The present invention relates to a vehicle lamp.

BACKGROUND ART

Conventionally, a vehicle headlight is known that includes a projection lens disposed on an optical axis extending in the longitudinal direction of a vehicle, the projection lens including a radiation surface, an incident surface on which the light radiated from the radiation surface is incident, and a reference point disposed to face the incident surface, and a light source disposed at or near the reference point, and radiating white light that is incident on the incident surface into the projection lens, exits from the radiation surface, and is radiated to the front of the vehicle. The light source radiates white light by color mixture of at least first color light and second color light. In the white light directed to the optical axis, a ratio of the first color light is relatively high and, in the white light directed to a direction in which an angle with respect to the optical axis is larger, a ratio of the first color light is relatively low and a ratio of the second color light is relatively high. The radiation surface and/or the incident surface is shaped so that, of the light which is incident from the incident surface and into the projection lens, exits from the radiation surface and is radiated to the front of the vehicle, light of which incident position into the incident surface is a first position which is on or near the optical axis is controlled to a direction not parallel to the optical axis, light of which incident position into the incident surface is a second incident position away from the optical axis is controlled to a direction to be parallel to the optical axis, and regarding light of which incident position into the incident surface is located between the first position and the second position, the incident position into the incident surface is controlled gradually to a direction to be parallel to the optical axis as the incident position approaches from the first position to the second position (see Patent Literature 1).

In Patent Literature 1, with the structure described above, the shapes of the light radiation surface and/or the incident surface of the projection lens are/is designed so that the light of which incident position into the incident surface is the first position on (or near) the optical axis is controlled to be directed in a direction not parallel to the optical axis, the light of which incident position into the incident surface is the second incident position away from the optical axis is controlled to a direction to be parallel to the optical axis, and regarding light of which incident position into the incident surface is located between the first position and the second position, the incident position into the incident surface is controlled gradually to a direction to be parallel to the optical axis as the incident position approaches from the first position to the second position. Therefore, chromaticity of a predetermined light distribution pattern (e.g., light distribution pattern for high-beam) can be within a white range under a Standard (e.g., JIS "D5500") even only partially. Patent Literature 1 also describes a case of a vehicle lamp for low-beam.

CITATION LIST

Patent Literature

Patent Literature 1: Japanese Unexamined Patent Application Publication No. 2014-164876

SUMMARY OF THE INVENTION

Problems to be Solved by the Invention

There has been a vehicle lamp that forms a low-beam light distribution pattern by multiplexing a diffusion light distribution pattern and a collection light distribution pattern which are formed individually. In this kind of vehicle lamp, it has been desired to reduce the size of the vehicle lamp by reducing the size of a structure for forming the diffusion light distribution pattern and a structure for forming the collection light distribution pattern.

The present invention has been made in view of the problem described above, and an object thereof is to provide a vehicle lamp of which a structure for forming a diffusion light distribution pattern can be reduced in size and the size of the vehicle lamp can be reduced.

Means for Solving the Problems

To achieve the above object, the present invention is understood by the following structures.

(1) A vehicle lamp of the present invention includes a semiconductor light source, a second lens that includes an incident surface disposed on a front side of the light source, in which two convex parts projecting toward the light source at positions outside of a center in the horizontal direction are connected on the central side, and an inwardly recessed part is formed on the central side, and a radiation surface configured to radiate light incident from the incident surface to the front of the vehicle, and a first lens disposed between the light source and the second lens, configured to convert distribution of light from the light source into distribution of light to be incident on the incident surface of the second lens, and radiate the light from the light source at the second lens so that a diffusion light distribution pattern radiated to the front of the vehicle is extended to the outside of the vehicle in a horizontal direction, wherein the recessed part of the incident surface of the second lens is formed in a planar shape to perform light distribution control to form substantially the entire shape of the diffusion light distribution pattern, and an outer part of the incident surface of the second lens in the horizontal direction is formed in a planar shape to perform light distribution control to form a high luminosity zone on the central side in the horizontal direction of the diffusion light distribution pattern.

(2) In the structure of (1), the recessed part that performs light distribution control to form substantially the entire shape of the diffusion light distribution pattern is a part located closer to the center than the positions of the two convex parts of the second lens most projecting toward the light source, and an intermediate part extending from an outside of the recessed part of the second lens in the horizontal direction to an inside of the outer part in the horizontal direction is formed in a shape of an incident surface to perform cross light distribution control from the recessed part side toward the outer part side so that the incident surface on the recessed part side radiates light on the outer side of the diffusion light distribution pattern, and the incident surface on the outer part side radiates light at a position near the outside of the high luminosity zone.

(3) In the structure of (2), the intermediate part extends over the inflection points of the convex parts, and the outer part of the second lens is located outer than the inflection points of the convex parts.

(4) In the structures of any one of (1) to (3), the outer part of the incident surface of the second lens is formed in a planar shape to perform cross light distribution control so that, sequentially from the inside to the outside in the horizontal direction, light is radiated at a high luminosity zone outer part on the opposite side across a light source optical axis from an outer part of of the high luminosity zone outer side of the light source optical axis.

(5) In the structures of any one of (1) to (4), the incident surface of the second lens performs light distribution control so that the light to be radiated from the radiation surface on the central side of the second lens in the vertical direction is radiated on the lower side of the diffusion light distribution pattern, and the light to be radiated from the radiation surface on the upper and lower sides in the vertical direction of the second lens is radiated on the cutoff line side above the diffusion light distribution pattern.

(6) In the structures of any one of (1) to (5), the recessed part configured to perform light distribution control to form substantially entire the shape of the diffusion light distribution pattern is a part in which light radiated from the light source at an angle equal to or larger than about approximately 15 degrees with reference to the light source optical axis in the horizontal direction is radiated through the first lens.

(7) In the structures of any one of (1) to (6), the outer part of the second lens is a part in which light radiated from the light source at an angle equal to or larger than about approximately 35 degrees with reference to the light source optical axis in the horizontal direction is radiated through the first lens.

(8) In the structures of any one of (1) to (6), the radiation surface of the first lens is formed in a planar shape projecting to separate from the light source, and a part of the first lens most projecting to separate from the light source of the radiation surface is located on the side on which an angle at which the diffusion light distribution pattern extends is large.

(9) In the structure of (8), the radiation surface of the first lens is formed in a shape in which, with reference to the part most projecting to separate from the light source of the radiation surface of the first lens, a side on the light source optical axis has a smaller curvature than that of the side opposite to the light source optical axis.

(10) In the structures of any one of (1) to (9), the radiation surface of the first lens is formed in a planar shape in which, when the light is made to be incident from the radiation surface side of the second lens, with the basic focal point of the second lens being as an origin, the focal position of the second lens in an area defined by two line segments with an angle of approximately 35 degrees in the horizontal direction with respect to the light source optical axis is shifted to the inside of the vehicle with respect to the basic focal point of the second lens as the central side of the incident surface from the outside in the horizontal direction of the central region of the first lens.

Effect of the Invention

According to the present invention, a vehicle lamp capable of reducing the size of a structure for forming a diffusion light distribution pattern and reducing the size of the vehicle lamp can be provided.

MODE FOR CARRYING OUT THE INVENTION

Hereinafter, modes for carrying out the present invention (hereinafter, referred to as "embodiments") will be described in detail with reference to the accompanying drawings. Like elements throughout the entire description of the embodiments will be denoted by like numerals. Also, unless otherwise noted, in the embodiments and drawings, "front" and "rear" indicate a "forward direction" and a "reverse direction," respectively, of the vehicle, and "upper," "lower," "left," and "right" all indicate directions from the viewpoint of a driver riding in the vehicle.

Figure 1:
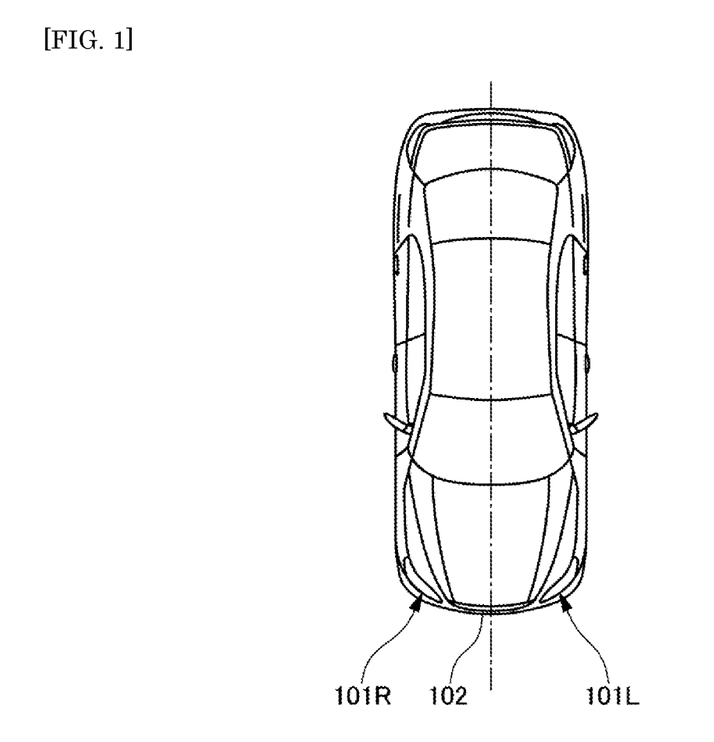
FIG. 1 is a plan view of a vehicle provided with a vehicle lamp according to an embodiment of the present invention.

A vehicle lamp according to an embodiment of the present invention is a vehicle lamp (101R, 101L) provided on the left and right sides, respectively, at the front of a vehicle 102 illustrated in FIG. 1. Below, the left vehicle lamp 101L will be described mainly, and the right vehicle lamp 101R will be described only different part. Below, the left vehicle lamp 101L may be referred to simply as a vehicle lamp.

The vehicle lamp according to the present embodiment includes a housing (not illustrated) that opened to the front of a vehicle, and an outer lens (not illustrated) attached to the housing so as to cover the opening. In a lamp chamber formed by the housing and the outer lens, a lamp unit 10 (see FIG. 2) according to the present embodiment that forms a diffusion light distribution pattern of a low-beam light distribution pattern, a lamp unit that forms a collection light distribution pattern multiplexed on the diffusion light distribution pattern, and the like are arranged.

(Lamp Unit)

Figure 2:
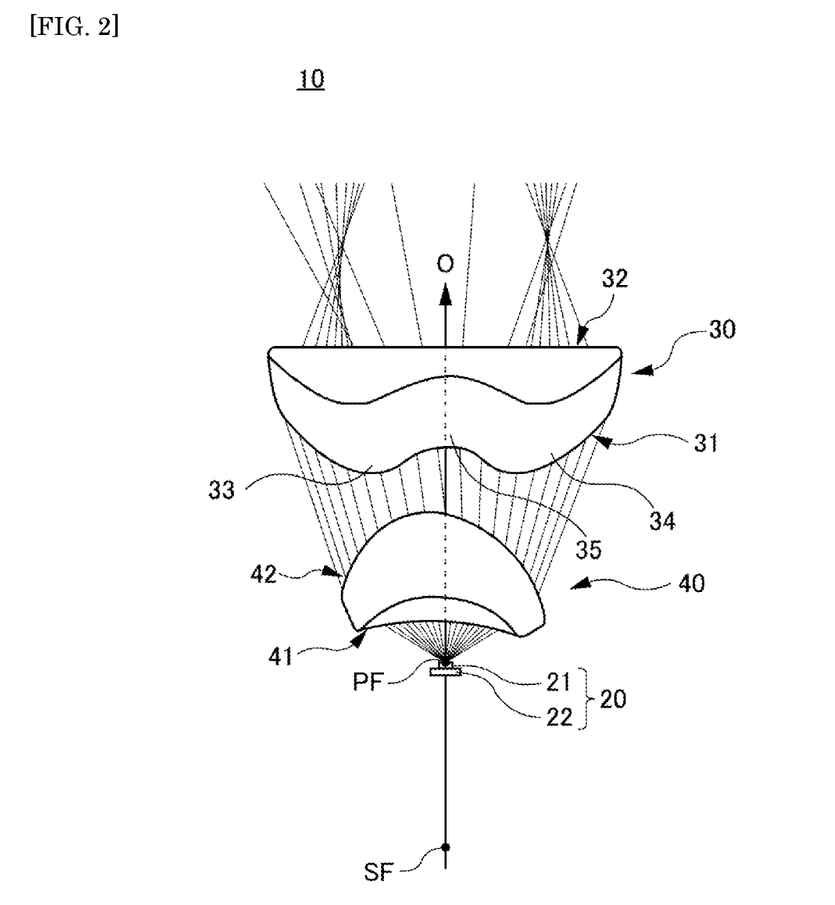
FIG. 2 is a top view illustrating a main part of a lamp unit according to an embodiment of the present invention.

FIG. 2 is a top view of a main part of the lamp unit 10 seen from above. As illustrated in FIG. 2, the lamp unit 10 includes a semiconductor light source 20, a second lens 30 arranged on the front side of the light source 20, and a first lens 40 arranged between the light source 20 and the second lens 30. In FIG. 2, many lines drawn from the light source 20 indicate a part of a luminous flux of light radiated from the light source 20.

Although not illustrated in FIG. 2, the light source 20 is placed on a heat sink (not illustrated). Also, only lens parts of the first lens 40 and the second lens 30 that controls light distribution are illustrated in FIG. 2. Actually, however, each of the first lens 40 and the second lens 30 has unillustrated flange parts integrally formed at both left and right ends. Each of the first lens 40 and the second lens 30 is mounted to the unillustrated heat sink via an unillustrated lens holder that holds the flange part.

(Description of Basic Structure)

Below, for the ease of understanding of structures of each part and the like, a basic structure will be described with reference to the most basic state illustrated in FIG. 3. After that, light distribution control by the first lens 40 and the second lens 30, and the like will be described in more detail.

(Light Source)

In the present embodiment, the light source 20 is a semiconductor LED in which light radiating chips 21 are provided on an aluminum mounting substrate 22 that has a power feeding structure. However, the light source 20 is not limited to the LED, and may be, for example, a semiconductor light source such as semiconductor laser (LD).

The light radiating chips 21 fabricated by some manufacturer may be sometimes chipped. If the light radiating chips 21 are chipped, it is desirable to arrange the light radiating chips 21 with the chipped portions being located on the upper side in the vertical direction.

Then, when light is radiated to the front from the lamp unit 10, the chipped part can be projected downward. By causing the chipped part to escape below the light distribution pattern, a favorable light distribution pattern can be formed.

(Basic Structure of First Lens)

The incident surface 41 on which light from the light source 20 of the first lens 40 is incident is formed as a complex quadratic surface with two axes in the horizontal direction and the vertical direction. In the present embodiment, the incident surface 41 is a concave surface of which both the horizontal axis and the vertical axis gradually curve inward.

However, the incident surface 41 may be a planar incident surface of which horizontal axis and vertical axis are both defined by straight lines, or an inwardly curving incident surface of which horizontal axis is defined by a straight line and vertical axis is defined by an inwardly curved line.

A radiation surface 42 of the first lens 40 is formed as a free-form curved surface so that light incident thereon is radiated toward the second lens 30 as a predetermined radiation pattern. A specific shape of the radiation surface 42 is illustrated in FIG. 2, however, a basic shape before formed to be such a shape is illustrated here. Details of the light distribution control by the first lens 40 will be described below.

A focal length (backward focal distance) of the first lens 40 is approximately 5.5 mm, and the first lens 40 is arranged so that a basic focal point PF (backward focal point) is located at a light radiation center of the light radiating chip 21 of the light source 20. An axis in the front-rear direction passing through the light radiation center is a light source optical axis O, and the basic focal point PF of the first lens 40 is located on the light source optical axis O. Therefore, the first lens 40 is disposed in a position approximately 5.5 mm forward of the light source 20.

When the first lens 40 is located near the light source 20 as described above, a temperature of the first lens 40 may easily rise due to heat generated by the light source 20. Therefore, the first lens 40 is desirably formed by polycarbonate-based resin, silicon (SLR), glass, and the like, which are heat resistant. In the present embodiment, the first lens 40 is formed by polycarbonate-based resin.

(Basic Structure of Second Lens)

The second lens 30 is rectangular in outer shape in a plan view seen from the radiation surface 32 side. In the present embodiment, the radiation surface 32 that radiates light is substantially flat. However, the shape of the light radiation surface 32 is not limited to flat, but the shape of the second lens 30 may be arbitrarily determined in accordance with the request of designs, and the like.

The incident surface 31 of the second lens 30 is formed as a free-form curved surface in accordance with a state of the radiation surface 32 so that a light distribution pattern formed by the light radiated from the radiation surface 32 to the front of the vehicle has a predetermined shape.

In the present embodiment, the incident surface 31 is formed in a shape in which two convex parts 33 and 34 projecting toward the light source 20 at positions outside of a center in the horizontal direction (on the light source optical axis O) are connected on the central side, and an inwardly recessed part 35 is formed on the central side.

A basic focal point SF (backward focal point) of the second lens 30 is located on the light source optical axis O, and is located farther away from the light source 20 on the rear side. Specifically, the basic focal point SF is located 16 mm backward of the basic focal point PF (the light radiation center of the light radiating chip 21) of the first lens 40.

That is, the second lens 30 is located significantly closer to the light source 20 than when the basic focal point SF is arranged at the light radiation center of a typical light radiating chip. Therefore, the size of the lamp unit 10 in the front-rear direction can be reduced significantly.

Although the second lens 30 is located near the light source 20, a distance between the second lens 30 and the light source 20 is long enough to avoid a temperature rise in the second lens 30 to be high due to heat generated by the light source 20, and the first lens 40 is located between the second lens 30 and the light source 20, it is not necessary to consider a thermal influence. Therefore, materials vulnerable to heat, such as acrylic resin, may be desirably used for the second lens 30.

Typically, the same materials with different wavelengths have different refractive indices. When the wavelength dependence of the refractive index is large, spectroscopy tends to occur, and a blue spectral color tends to appear in part of the light distribution pattern.

Therefore, materials used for the second lens 30 are not particularly limited if they are transparent. However, a spectral influence can be reduced when materials of which wavelength dependence of refractive index is small are used, and acrylic resin, such as PMMA, of which wavelength dependence of refractive index is small is desirably used. In the present embodiment. The second lens 30 is formed by acrylic resin.

Figure 3:
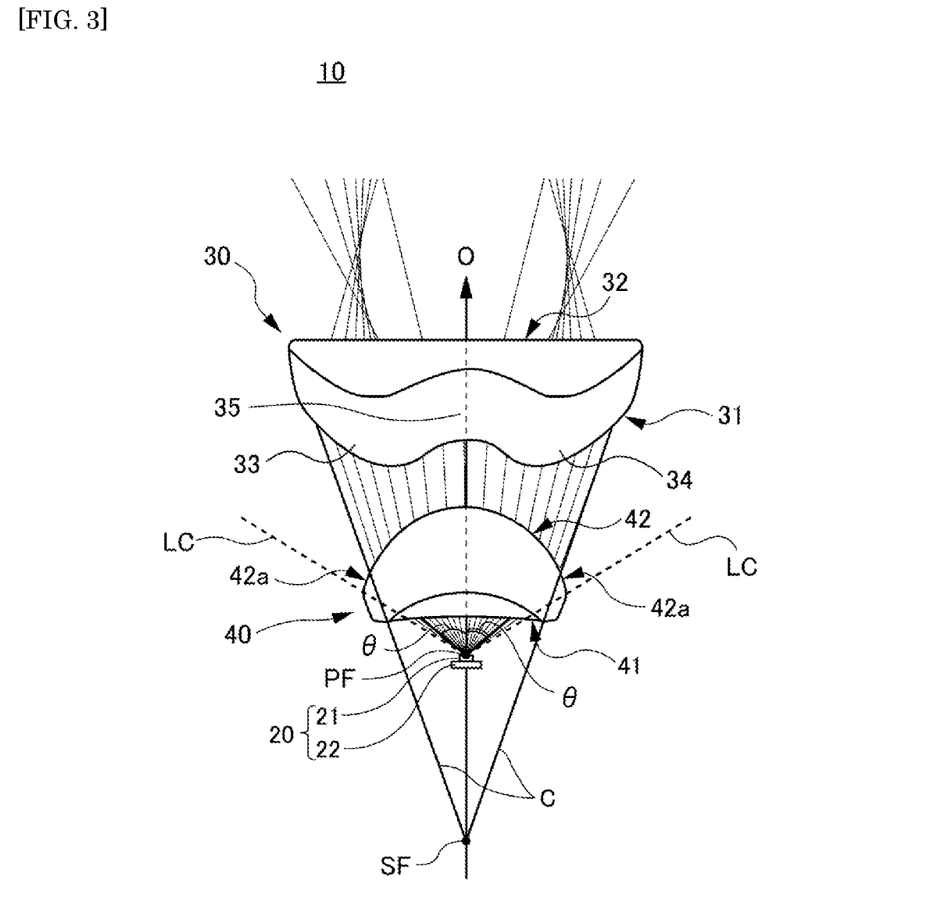
FIG. 3 is a view for explaining the most fundamental basic structure of a lamp unit according to an embodiment of the present invention.

A distribution range of light when the light is radiated from the light source 20 to the front without passing through the first lens 40 is depicted by dotted lines in FIG. 3. This shows that, if no first lens 40 is provided, a greater amount of light that is not incident on the incident surface 31 of the second lens 30 would exist. The light distribution state of the luminous flux from the light source 20 depicted by the dotted lines may be referred to as a light cone LC.

To enable the light that currently cannot be incident on the second lens 30 to be able to be incident on the second lens 30, it is necessary to increase a width of the second lens 30 in the horizontal direction, which hinders reduction of the second lens 30 in size in the horizontal direction.

Therefore, in the present embodiment, the first lens 40 is disposed between the light source 20 and the second lens 30. With the existence of the first lens 40, distribution of light from the light source 20 is converted into distribution of light to be incident on the incident surface 31 of the second lens 30 and, therefore, the size of the second lens 30 in the horizontal direction can also be reduced. Then, description of basic light distribution control by the first lens 40 will be continued below.

As illustrated in FIG. 3, the radiation surface 42 controls light distribution so that, of the light radiated from the light source 20, the light incident on the incident surface 41 of the first lens 40 on which light equal to or smaller than a horizontal radiation angle θ (approximately 35 degrees) is to be incident with reference to the light source optical axis O is radiated in substantially the same distribution state as that of the cone C that connects the second lens 30 and the basic focal point SF of the second lens 30 when the light is radiated toward the second lens 30 from the radiation surface 42.

The light radiated from the light source 20 at an angle larger than the horizontal radiation angle θ (approximately 35 degrees) with reference to the light source optical axis O and is incident on the incident surface 41 of the first lens 40 is radiated from an unillustrated outer radiation surface 42a located outside of the cone C of the radiation surface 42 toward the second lens 30.

However, by merely causing the distribution state of the light to match with the cone C as described above, the light radiated from the outer radiation surface 42a is radiated merely along an outer periphery of the cone C. Therefore, the light is radiated outside of the incident surface 41 in the horizontal direction.

The outer radiation surface 42a controls light distribution so that the light radiated from the outer radiation surface 42a is converted further inward to be incident on the incident surface 31 of the second lens 30 outside of the second lens 30 in the horizontal direction.

That is, a basic surface shape of the radiation surface 42 of the first lens 40 is determined so that the shape of the light from the light source 20 is made to match with the shape of the cone C of the second lens 30 and, the light of which radiation angle θ in the horizontal direction from the light source 20 is greater than a predetermined angle (approximately 35 degrees) is converted inward and is made to be incident on the incident surface 31 of the second lens 30 outside of the second lens 30 in the horizontal direction.

As described above, light distribution is controlled by the incident surface 31 of the second lens 30 so that the light incident on the second lens 30 from the incident surface 31 of the second lens 30 forms a predetermined light distribution pattern when radiated to the front of the vehicle from the radiation surface 32 of the second lens 30. Next, basic light distribution control of the second lens 30 will be described.

Figure 4:
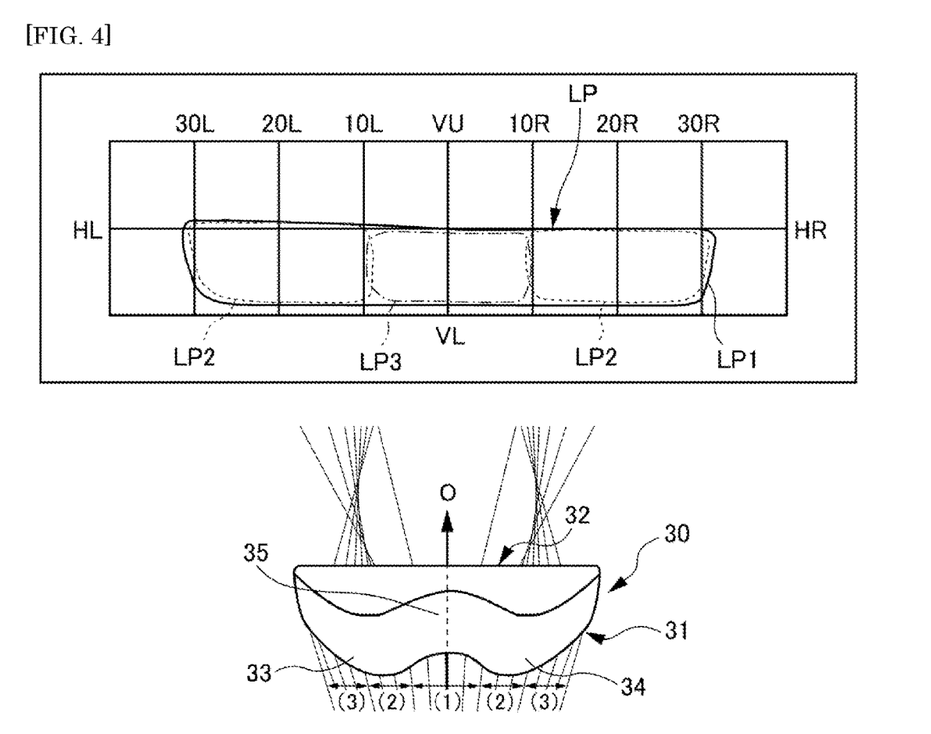
FIG. 4 is a view for explaining light distribution control of a second lens according to an embodiment of the present invention.

FIG. 4 is a diagram for explaining light distribution control of the second lens 30. In a lower half of FIG. 4, the second lens 30 and a luminous flux radiated through the first lens 40 and incident on the incident surface 31 of the second lens 30, and a luminous flux radiated to the front of the vehicle from the radiation surface 32 of the second lens 30 are illustrated. In an upper half of FIG. 4, a diffusion light distribution pattern LP on a screen formed by light (luminous flux) radiated to the front of the vehicle through the second lens 30 is illustrated.

In the upper half of FIG. 4 illustrating the diffusion light distribution pattern LP on a screen, a VU-VL line is a vertical line on the screen, and an HL-HR line is a horizontal line on the screen. Also hereinafter, in diagrams illustrating a light distribution pattern on a screen, a VU-VL line is a vertical line on the screen, and an HL-HR line is a horizontal line on the screen.

As illustrated in FIG. 4, the two convex parts 33 and 34 of the incident surface 31 of the second lens 30 has an inwardly recessed part 35 on the central side in the horizontal direction of inflection points most projecting toward the light source 20. The recessed part 35 forms a light distribution pattern LP1 that forms substantially the entire shape of the diffusion light distribution pattern LP.

More specifically, light distribution is controlled so that a part of the recessed part 35 depicted by a double-headed arrow (1) on which light which is radiated from the radiation surface 42 of the first lens 40 on the central side is incident (hereinafter, sometimes referred to as "a part in the recessed part 35") forms the light distribution pattern LP1 (see the upper half of the diagram) which is substantially the entire shape of the diffusion light distribution pattern LP. That is, the light distribution pattern LP1 that is substantially the entire shape of the diffusion light distribution pattern LP is formed by the light of which distribution is controlled in a position closer to the center than the convex parts 33 and 34 most projecting toward the light source 20 in the recessed part 35.

A part of the recessed part 35 that forms the light distribution pattern LP1 which is substantially the entire shape of the diffusion light distribution pattern LP of the incident surface 31 is formed in a planar shape to perform light distribution control so that the light incident from the light source optical axis O side into the more outside in the horizontal direction, and radiated from the more outer radiation surface 32 in the horizontal direction (the left-right direction in the diagram) radiates light to the outer side and forms an outer side of the light distribution pattern LP1. Therefore, the outer part of the light incident surface 31 in the horizontal direction depicted by the double-headed arrow (1) mainly forms an outer part of the diffusion light distribution pattern LP in the horizontal direction.

That is, the outer left part of the incident surface 31 on which the light on the central side depicted by the double-headed arrow (1) is incident mainly forms the most outer left part of the diffusion light distribution pattern LP. The outer right part mainly forms the most outer right part of the diffusion light distribution pattern LP.

An intermediate part of the incident surface 31 on which the light of a range depicted by double-headed arrows (2) adjacent to an outside of the light on the central side depicted by the double-headed arrow (1) is incident controls light distribution so that the light is radiated from the radiation surface 32 to form a light distribution pattern LP2 extending to a position near an outside of a high luminosity zone (a part in which alight distribution pattern LP3 is located) from a position near an outside of the diffusion light distribution pattern LP to be multiplexed to the light distribution pattern LP1 that forms substantially the entire shape of the diffusion light distribution pattern LP as described above.

In particular, the intermediate part of the incident surface 31 adjacent to the part of the recessed part 35 forming the light distribution pattern LP1 that forms substantially the entire shape of the diffusion light distribution pattern LP as described above controls light distribution so that, when the light incident on this part is radiated from the radiation surface 32, the light is to be radiated in a position near an outside of the diffusion light distribution pattern LP on the intermediate part side than the light source optical axis O.

That is, the central side of the intermediate part on the left side of the light source optical axis O in the horizontal direction (the left-right direction in the diagram) controls light distribution so that light is radiated to a position near the outer side of the diffusion light distribution pattern LP on the left side of the light source optical axis O (the VU-VL line). Also, the central side of the intermediate part on the right side of the light source optical axis O in the horizontal direction (the left-right direction in the diagram) controls light distribution so that light is radiated to a position near the outer side of the diffusion light distribution pattern LP on the right side of the light source optical axis O (the VU-VL line).

The intermediate part of the incident surface 31 is formed as a planar shape that performs cross light distribution control so that the light incident into the more outside of the intermediate part is, when radiated from the radiation surface 32, radiated in a position more closer to an outside of the high luminosity zone of the diffusion light distribution pattern LP (a position in which the light distribution pattern LP3 is located) further toward the intermediate part than the light source optical axis O.

That is, the intermediate part on the left side of the light source optical axis O performs cross light distribution control so that the light incident on the more outer side (left side) is, when radiated from the radiation surface 32, radiated in a portion more closer to the outer left side of the high luminosity zone of the diffusion light distribution pattern LP on the left side of the light source optical axis O (the VU-VL line) (a portion in which the light distribution pattern LP3 is located). The intermediate part on the right side of the light source optical axis O performs cross light distribution control so that the light incident on the outer side (right side) is, when radiated from the radiation surface 32, radiated in a portion near the outer right side of the high luminosity zone of the diffusion light distribution pattern LP on the right side of the light source optical axis O (the VU-VL line) (a portion in which the light distribution pattern LP3 is located).

A further outer part of the incident surface 31 on which the light of a range depicted by double-headed arrows (3) outside of the range depicted by the double-headed arrows (2) is incident performs control of light distribution so that light is made to radiate from the radiation surface 32 to mainly form the light distribution pattern LP3 that is to be multiplexed on an area of the central side of the diffusion light distribution pattern LP as described above which is the high luminosity zone of the diffusion light distribution pattern LP.

The outer part forms the light distribution pattern LP3 that forms the high luminosity zone and, therefore, a surface area of the incident surface 31 that becomes the outer part needs to be relatively large to obtain a quantity of light.

The outer part is continued from the intermediate part, and when the intermediate part is formed to extend excessively outward, an area of the incident surface 31 which will be the outer part cannot be obtained. Therefore, the intermediate part extending over the inflection points of the convex parts 33 and 34 controls light distribution so that the light radiation direction is converted inward before the light reaches the inflection points of the convex parts 33 and 34 and, the intermediate part is connected to the outer part at positions slightly exceeded the inflection points.

The outer part of the incident surface 31 controls light distribution so that the light is made to be radiated on the outer side of the high luminosity zone that is the outer side than the light source optical axis O when the light incident on the intermediate part side is radiated from the radiation surface 32.

That is, the central side on the outer left part of the light source optical axis O in the horizontal direction (the left-right direction in the diagram) controls light distribution so that light is radiated toward an outer part of the high luminosity zone (the outer left part of the light distribution pattern LP3) on the left side of the light source optical axis O (the VU-VL line), and the central side on the outer right part of the light source optical axis O in the horizontal direction (the left-right direction in the diagram) controls light distribution so that light is radiated toward an outer part of the high luminosity zone (the outer right part of the light distribution pattern LP3) on the right side of the light source optical axis O (the VU-VL line).

The outer part of the incident surface 31 is, from the intermediate part toward the outer side of the outer part, formed in a planar shape to perform cross light distribution control so that light is sequentially radiated from the outer part of the high luminosity zone on the outer part side of the light source optical axis O to the outer part of the high luminosity zone on the opposite side across the light source optical axis O.

More precisely, the outer part of the incident surface 31 is, from the intermediate part toward the outer side of the outer part, formed in a planar shape to perform cross light distribution control so that, light is sequentially radiated from the outer part of the high luminosity zone on the outer part side of the light source optical axis O to a further outside than the outer part of the high luminosity zone on the opposite side across the light source optical axis O.

However, the light radiated to the outside exceeding the outer part of the high luminosity zone on the opposite side across the light source optical axis O is lower in luminous intensity and, substantially, the light mainly forms the outer part of the high luminosity zone on the opposite side of the light source optical axis O from the outer part of the high luminosity zone across the light source optical axis O.

That is, the outer left part of the light source optical axis O, from the intermediate part toward the outer side of the outer part (outer left side), performs cross light distribution so that, light is mainly radiated from outer part of the high luminosity zone on the left side of the light source optical axis O (the VU-VL line) to the outer part of the high luminosity zone on the right side opposite to the light source optical axis O (the VU-VL line). The outer right part of the light source optical axis O, from the intermediate part toward the outer side of the outer part (outer right side), performs cross light distribution control so that, light is mainly radiated from outer part of the high luminosity zone on the right side of the light source optical axis O (the VU-VL line) to the outer part of the high luminosity zone on the left side opposite to the light source optical axis O (the VU-VL line).

When the thus-formed light distribution patterns LP1, LP2, and LP3 are multiplexed, the diffusion light distribution pattern LP for a low-beam light distribution pattern is formed. Here, the diffusion light distribution pattern LP of the upper half of FIG. 4 shows that the width of the diffusion light distribution pattern LP in the horizontal direction is substantially the same on the left side and on the right side with respect to the VU-VL line.

However, by extending the diffusion light distribution pattern LP to the outside of the vehicle, a more visible diffusion light distribution pattern is obtained. Below, extending the diffusion light distribution pattern LP to the outside of the vehicle by adjusting a shape of the radiation surface 42 of the first lens 40 with reference to the basic structure of the first lens 40 will be described.

Figure 5:
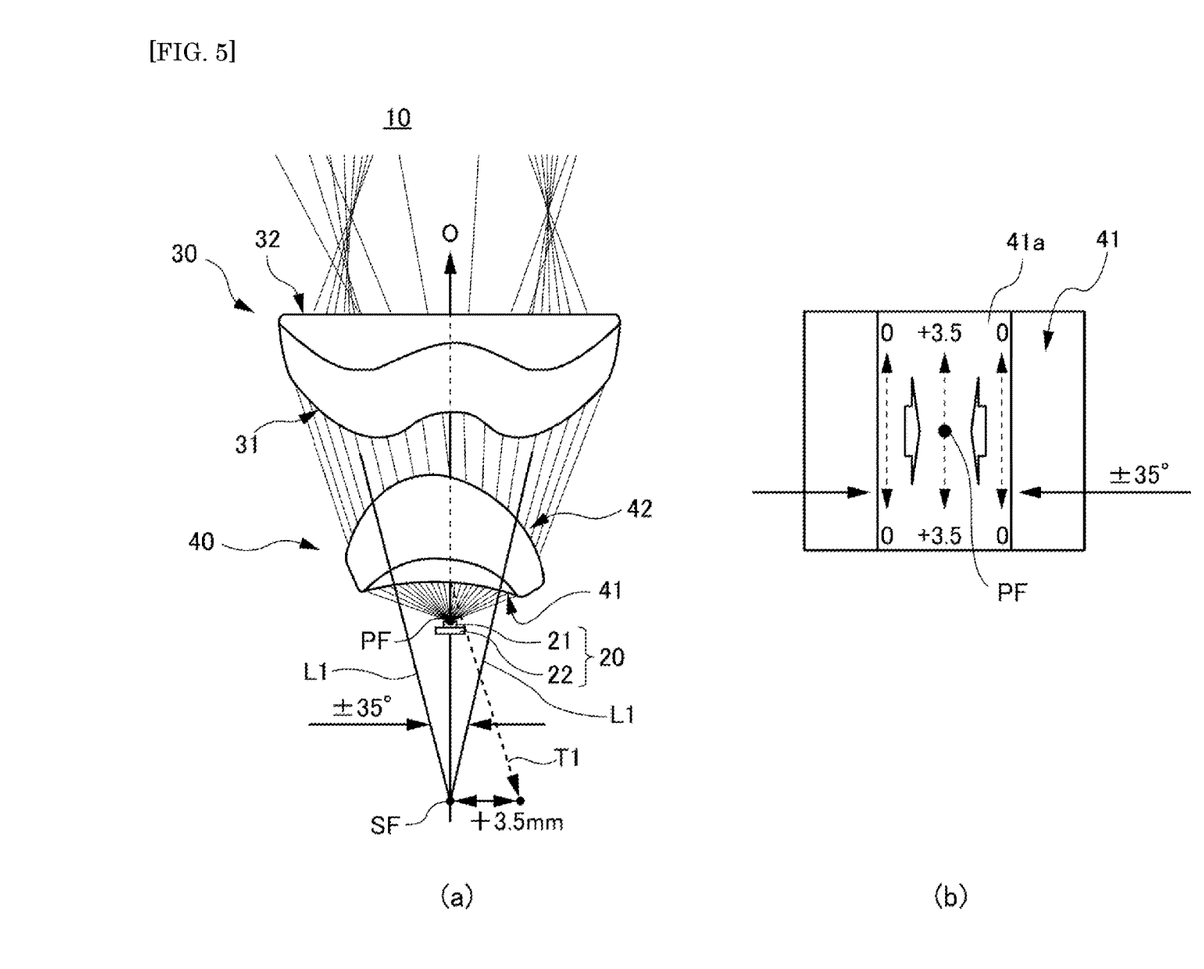
FIG. 5 is a view for explaining a shape of a radiation surface of a first lens according to an embodiment of the present invention, with (a) being a view like FIG. 2, and (b) being a view schematically illustrating a main range of an incident surface of the first lens.

FIG. 5 is a view for explaining a shape of the radiation surface 42 of the first lens 40 to extend the diffusion light distribution pattern LP to the outside of the vehicle, with (a) being a view like FIG. 2, and (b) being a view schematically illustrating a main range of the incident surface 41 of the first lens 40.

In FIG. 5(*a*), a range in which the horizontal angle is approximately ±35 degrees from the basic focal point SF of the second lens 30 with reference to the light source optical axis O is depicted by straight lines L1. A range of the incident surface 41 indicated as ±35 degrees located on the central side in the horizontal direction about the basic focal point PF of the first lens 40 of FIG. 5(*b*) indicates a range disposed between the straight lines L1 of FIG. 5(*a*).

Below, for the ease of description, a range of the incident surface 41 indicated as ±35 degrees in FIG. 5(*b*) may be referred to as a central region 41*a* of the incident surface 41. Also, in the present embodiment, the central region 41*a* also matches with a range in which the angle in the horizontal direction (the radiation angle θ of light (see FIG. 3)) with respect to the light source optical axis O is equal to or smaller than approximately 35 degrees with the basic focal point PF of the first lens 40 being an origin.

In the present embodiment, as described first, the left-side vehicle lamp 101L (see FIG. 1) is described. Therefore, the left side is the outside of the vehicle and the right side is the inside of the vehicle in FIG. 5(*a*) and FIG. 5(*b*).

The values illustrated in FIG. 5(*b*) indicate to what a degree a focal position of the light radiated toward the basic focal point SF of the second lens 30 from each position of the incident surface 41 of the first lens 40 is shifted with respect to the basic focal point SF when the light is radiated toward the basic focal point SF of the second lens 30 from the radiation surface 32 side of the second lens 30. A positive numeric value indicates that the focal position is shifted to the inside of the vehicle (right side of the diagram) with respect to the basic focal point SF (the unit of the numerical value: mm).

In FIG. 5(*b*), the numeral values of +3.5 mm are shown upper and lower sides of the central portion in the horizontal direction of the first lens 40, and a dotted double-headed arrow is depicted between these values. The clotted double-headed arrow indicates that the numeric values existing between these values are also the same value, i.e., +3.5.

That is, when light is made to be incident from the radiation surface 32 side of the second lens 30, a focal position of light radiated toward the basic focal point SF of the second lens 30 from the center in the horizontal direction of the incident surface 41 of the first lens 40 is shifted 3.5 mm to the inside of the vehicle from the basic focal point SF as depicted by a clotted arrow T1 of FIG. 5(*a*).

In FIG. 5(*b*), the numeral values of 0 are shown upper and lower outsides (outer left side and outer right sides) of the central region 41*a* in the horizontal direction. Similarly as above, dotted double-headed arrows between 0 of these upper and lower sides indicate that the numeric values existing between these values are also the same value, i.e., 0.

Therefore, when the light is made to be incident from the radiation surface 32 side of the second lens 30, the focal position of the light radiated toward the basic focal point SF of the second lens 30 from the outside in the horizontal direction (the outer left side and the outer right side) of the central region 41*a* of the incident surface 41 of the first lens 40 is located in the basic focal point SF of the second lens 30 without being shifted.

Thick arrows directed to the center from the outside of the central region 41*a* in the horizontal direction of FIG. 5(*b*) indicate that the values change slightly to interpose values existing between the outside value and the central value. That is, the thick arrows in FIG. 5(*b*) indicate that the values increase to the positive toward the center from the outside of the central region 41*a* in the horizontal direction, and that the numeric values become +3.5 that is the largest at the center. The control to shift the focal position is carried out by the planar shape of the radiation surface 42 of the first lens 40.

Therefore, the radiation surface 42 of the first lens 40 is formed in a planar shape in which, when the light is made to be incident from the radiation surface 32 side of the second lens 30, with the basic focal point SF of the second lens 30 as an origin, the focal position of the second lens 30 in an area defined by two line segments (see the straight lines L1 in FIG. 5(*a*)) with an angle of approximately 35 degrees in the horizontal direction with respect to the light source optical axis O is shifted to the inside of the vehicle with respect to the basic focal point SF of the second lens 30 as the central side of the incident surface 41 from the outside in the horizontal direction of the central region 41*a* of the first lens 40.

Therefore, as illustrated in FIG. 5(*a*), a part most projecting to separate from the light source 20 of the radiation surface 42 of the first lens 40 which has a planar shape projecting on the side to separate from the light source 20 is located on the outer side of the vehicle (left side in the diagram) with respect to the light source optical axis O to extend the diffusion light distribution pattern LP, that is, located on the side on which an angle at which the diffusion light distribution pattern LP extends is large. Further, a side on the light source optical axis O (right side in the view) that is the inner side of the vehicle in the horizontal direction with reference to the part most projecting to separate from the light source 20 of the radiation surface 42 of the first lens 40 has a smaller curvature (less steep curve shape) than that of the side opposite to the light source optical axis O that is the outside of the vehicle in the horizontal direction.

When the planar shape of the radiation surface 42 of the first lens 40 is shaped as described above, light distribution control is performed so that the diffusion light distribution pattern LP illustrated in the upper view of FIG. 4 extends to the outside of the vehicle.

In the above description, the first lens 40 for the left vehicle lamp 101L (see FIG. 1) has been described. For a right vehicle lamp 101R, the shape of the first lens 40 is inverted with respect to the light source optical axis O. The relations of the inside and outside (inside and outside of the vehicle) are also inverted in the left vehicle lamp 101L and the right vehicle lamp 101R, and the above explanation can be just applied to the right vehicle lamp 101R.

Figure 6:
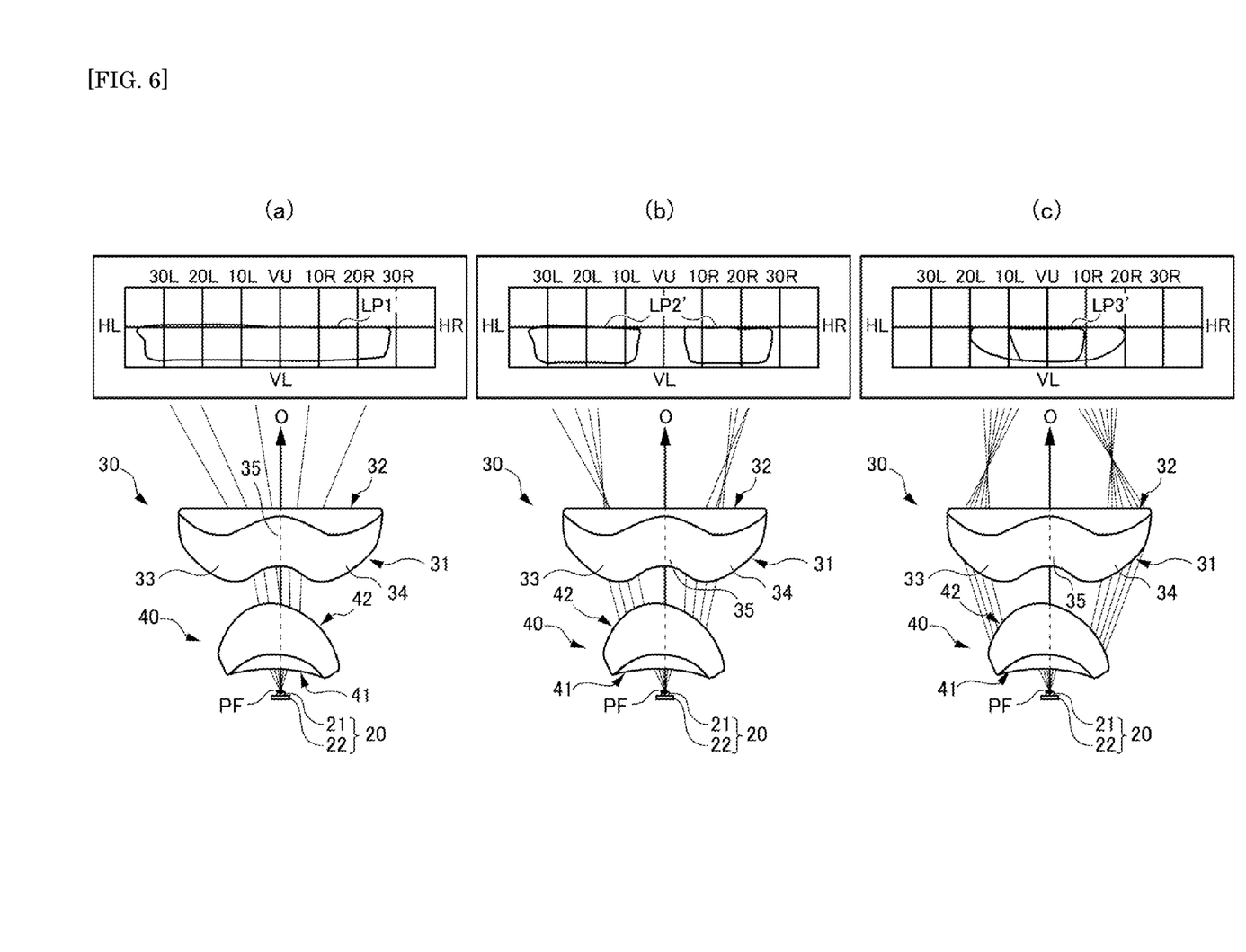
FIG. 6 is a view for explaining light distribution control by the first lens according to an embodiment of the present invention, with (a) being a view illustrating a state in which a light distribution pattern LP1' corresponding to a portion of a light distribution pattern LP1 of an upper half of FIG. 4 is formed, (b) being a view illustrating a state in which a light distribution pattern LP2' corresponding to a portion of a light distribution pattern LP2 of the upper half of FIG. 4 is formed, and (c) being a view illustrating a state in which a light distribution pattern LP3' corresponding to a portion of a light distribution pattern LP3 of the upper half of FIG. 4 is formed.

Below, a state of the light distribution control will be described with reference to FIG. 6. FIG. 6 is a view for explaining light distribution control by the first lens 40, with (a) being a view illustrating a state in which a light distribution pattern LP1' corresponding to a portion of a light distribution pattern LP1 of an upper half of FIG. 4 is formed, (b) being a view illustrating a state in which a light distribution pattern LP2' corresponding to a portion of a light distribution pattern LP2 of the upper half of FIG. 4 is formed, and (c) being a view illustrating a state in which a light distribution pattern LP3' corresponding to a portion of a light distribution pattern LP3 of the upper half of FIG. 4 is formed. As other figures above, the left side of the view corresponds to the vehicle left side and the right side of the view corresponds to the vehicle right side.

Although a range of the light distribution pattern LP3' is slightly larger than the high luminosity zone in FIG. 6(c), luminous intensity in the outer side of the high luminosity zone is low as described above, and a range about 10 degrees in the left and right on the screen is a main part of the light distribution pattern LP3' (the range of from 10L to 10R).

In FIG. 6, a lower half illustrates a state of the luminous flux of the light radiated from the light source 20 and is incident on the second lens 30 through the first lens 40, and an upper half illustrates a state of the light distribution pattern formed on the upper half. Note that a part of the luminous flux is illustrated in the diagram, and a large number of light beams actually exist between the illustrated light beams.

As illustrated in FIG. 6(a), the light of which radiation angle in the horizontal direction with respect to the light source optical axis O is equal to or smaller than approximately 15 degrees of the light radiated from the light source 20 is radiated inclined to the outside of the vehicle due to the planar shape of the radiation surface 42 when the light is radiated toward the second lens 30 from the radiation surface 42 of the first lens 40.

The light is incident with the inclination of an amount of control of the first lens 40 on the part forming the light distribution pattern LP1 that forms substantially the entire shape of the diffusion light distribution pattern LP in the recessed part 35 of the second lens 30 described in the basic structure.

As a result, the entire light distribution pattern formed by the light radiated to the front of the radiation surface 32 of the second lens 30 is shifted to the outside of the vehicle as compared with the light distribution pattern LP1 of FIG. 4, and the light distribution portion located outside of the vehicle extends to the outside of the vehicle (see the light distribution pattern LP1' in the upper half of the diagram).

Also, as illustrated in FIG. 6(b), of the light radiated from the light source 20, the light of which radiation angle in the horizontal direction with respect to the light source optical axis O is from approximately 15 degrees to approximately 35 degrees, that is, the light of which radiation angle in the horizontal direction on the left side in the diagram is from approximately 15 degrees to approximately 35 degrees and the light of which radiation angle in the horizontal direction on the right side in the diagram is approximately 15 degrees to approximately 35 degrees is made to radiate at the intermediate part of the incident surface 31 of the second lens 30 as described above with reference to FIG. 4, and forms a light distribution pattern in a range of from the outside of the diffusion light distribution pattern to the outside of the central high luminosity zone (see the light distribution pattern LP2' in the upper half of the diagram).

Furthermore, as illustrated in FIG. 6(c), of the light radiated from the light source 20, the light of which radiation angle in the horizontal direction is larger than approximately 35 degrees with reference to the light source optical axis O, that is, the light of which radiation angle in the horizontal direction on the left side in the diagram is larger than approximately 35 degrees, and the light of which radiation angle in the horizontal direction on the right side in the diagram is larger than approximately 35 degrees, is made to radiate at the outer part of the incident surface 31 of the second lens 30 as described above with reference to FIG. 4, and forms a light distribution pattern in a range of a high luminosity zone of a diffusion light distribution pattern (see the light distribution pattern LP3' of the upper half in the diagram).

The light distribution pattern LP3' which is the high luminosity zone forms an inside of the vehicle (right side in the diagram) in which the light radiated from the outside of the vehicle (left side in the diagram) of the second lens 30 (a range of from 10L to 20R) becomes the high luminosity zone, and forms an outside of the vehicle (right side in the diagram) in which the light radiated from the inside of the vehicle (left side in the diagram) of the second lens 30 (a range of from 20L to 10R) becomes the high luminosity zone.

However, as described above, the light in the range of from 10L to 20L and from 10R to 20R which are outside of the high luminosity zone has lower luminous intensity than that of the light in the range of from 10L to 10R, and the light distribution pattern LP3' mainly forms light distribution in the range of from 10L to 10R in the diffusion light distribution pattern.

Figure 7:
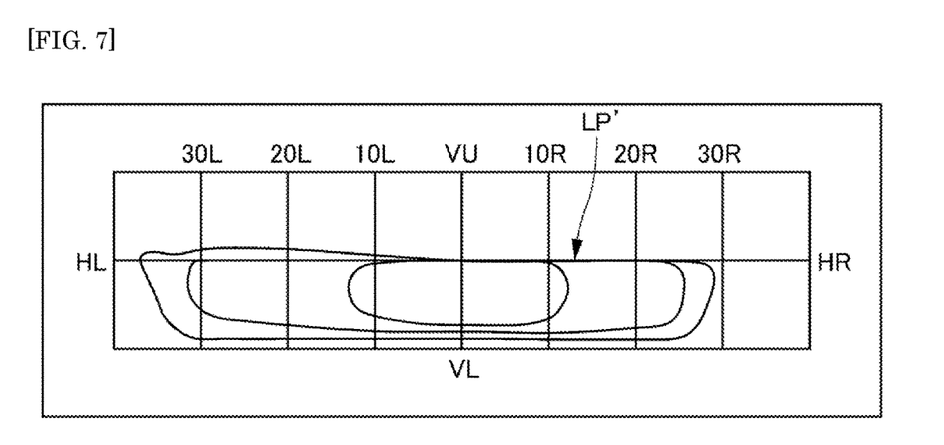
FIG. 7 is a diagram illustrating a diffusion light distribution pattern on a screen of a lamp unit according to an embodiment of the present invention.

When the thus-formed light distribution patterns (see light distribution patterns LP1' to LP3' of FIG. 6(a) to (c)) are multiplexed, an extended diffusion light distribution pattern LP' illustrated in FIG. 7 is formed. It is known by comparing the diffusion light distribution pattern LP of FIG. 4 and the diffusion light distribution pattern LP' of FIG. 7 that the diffusion light distribution pattern LP' illustrated in FIG. 7 is extended to the outside of the vehicle so as to improve outer visibility of the vehicle.

Here, as is known from FIG. 6(c), a range with mainly high luminous intensity (range of from 10L to 10R) in the light distribution pattern LP3' forming the high luminosity zone of FIG. 6(c) is substantially the same range in the light distribution pattern LP3 forming the high luminosity zone illustrated in FIG. 4. Though not illustrated in FIG. 4, the light distribution pattern LP3 is also a light distribution pattern in which light of low luminous intensity exists near the outside of the high luminosity zone.

Therefore, in the light distribution control with the first lens 40, by keeping the high luminosity zone unchanged, substantially the same amount of light as in the high luminosity zone of the diffusion light distribution pattern LP illustrated in FIG. 4 is kept and the light distribution pattern LP1 which forms substantially the entire diffusion light distribution pattern LP is extended to the outside of the vehicle.

The lamp unit 10 according to the present embodiment forms a diffusion light distribution pattern for a low-beam light distribution pattern and is subject to light distribution control so that the light distribution pattern is located below a cutoff line. Description of this point will be continued with reference to FIG. 8.

Figure 8:
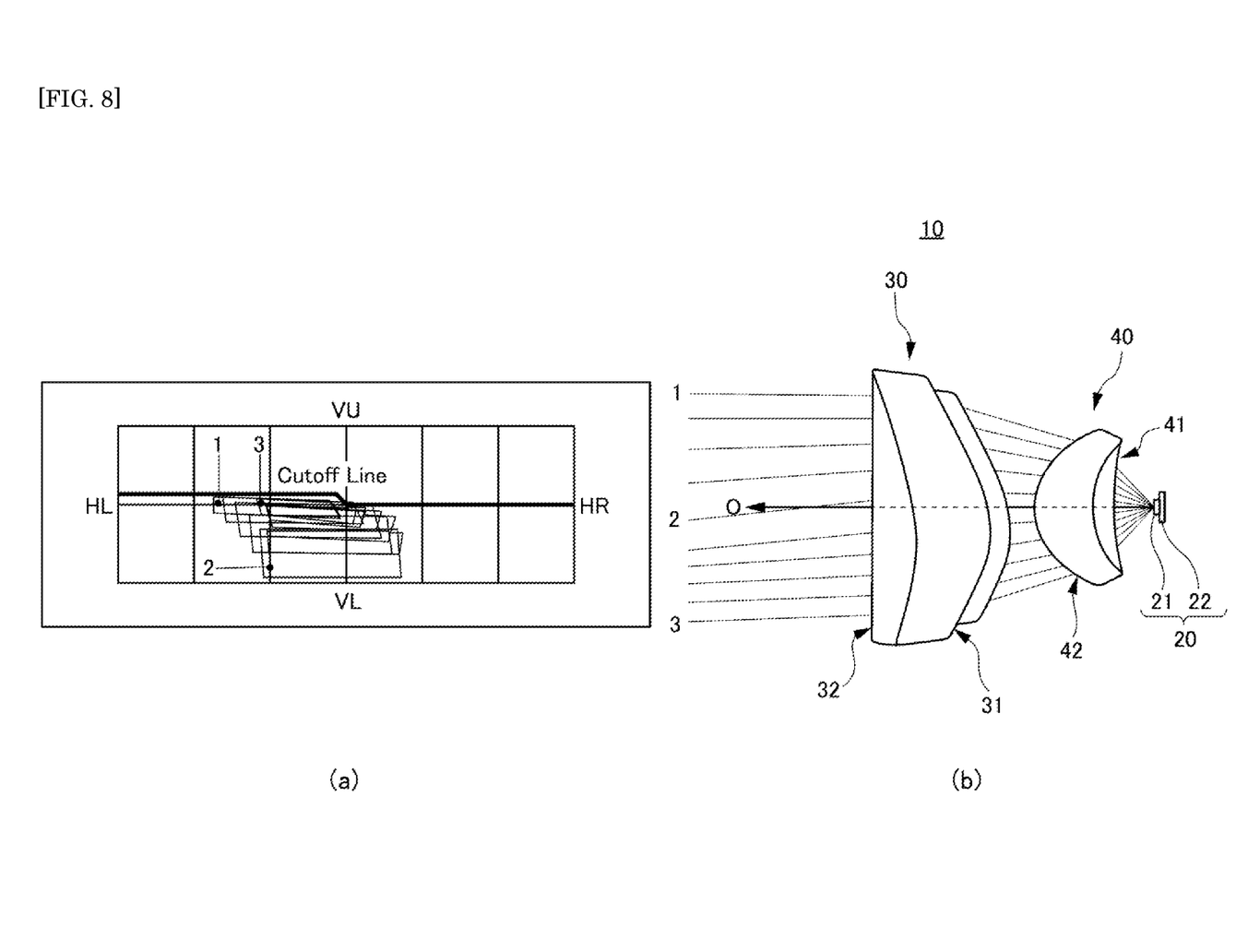
FIG. 8 is a view for explaining light distribution control in the vertical direction of a lamp unit according to an embodiment of the present invention, with (a) being a view illustrating a light distribution image group of a light source on a screen, and (b) being a side view of a main part of a lamp unit.

FIG. 8 is a view for explaining light distribution control in the vertical direction, with (a) being a view illustrating a light distribution image group of the light source 20 on the screen, and (b) being a side view illustrating the light source 20, the first lens 40, and the second lens 30 seen from a lateral direction.

As is known from FIG. 8(a), each light distribution image radiated through the first lens 40 and the second lens 30 basically has a shape of which left side is higher than a right side, which is a desirable shape to form a diffusion light distribution pattern having an oblique cutoff line.

The light distribution image indicated by the numeral value 2 in FIG. 8(*a*) is a light distribution image formed by the light radiated from the position indicated by 2 of FIG. 8(*b*), that is, the light distribution image radiated from the central side in the vertical direction of the radiation surface 32 of the second lens 30.

Similarly, the light distribution images indicated by the numeral values 1 and 3 in FIG. 8(*a*) are light distribution images formed by light radiated from positions indicated by 1 and 3 in FIG. 8(*b*), that is, the light distribution images are radiated from the upper and lower sides in the vertical direction of the radiation surface 32 of the second lens 30. The light distribution control is performed by the incident surface 31.

Therefore, the incident surface 31 of the second lens 30 is formed in a planar shape to control light distribution so that the light to be radiated to the front of the vehicle from the radiation surface 32 on the central side in the vertical direction is radiated on the lower side of the diffusion light distribution pattern, and the light to be radiated to the front of the vehicle from the radiation surface 32 on the upper and lower sides in the vertical direction is radiated on the cutoff line side above the diffusion light distribution pattern.

The incident surface 31 of the second lens 30 on the central side in the vertical direction is close to the radiation surface 42 of the first lens 40 that can be considered as a virtual light source. Therefore, shift of the light radiation direction easily occurs when, for example, shift in light incident positions occurs due to an assembly error of the first lens 40 and the second lens 30.

Therefore, when light distribution control is performed so that the light to be radiated to the front of the vehicle from the radiation surface 32 on the central side in the vertical direction of the second lens 30 is controlled to the cutoff line side of the diffusion light distribution pattern, there is a possibility that the light is radiated on the upper side of the cutoff line when a shift in the light radiation direction occurs. If the light distribution is controlled so that the light is made to radiate on the lower side of the diffusion light distribution pattern as described above, radiation of light on the upper side of the cutoff line can be avoided and occurrence of glare light can be reduced.

Although the present invention has heretofore been described based on a specific embodiment, the present invention is not limited to the above embodiment. For example, in the present embodiment, the diffusion light distribution pattern has an oblique cutoff line. However, some cutoff lines have no oblique cutoff lines in some areas, and the present embodiment is not limited to those having an oblique cutoff line.

Regarding the second lens 30, the left and the right vehicle lamps 101L and 101R may be in the same shape. However, the planar shape of the incident surface 31 of the second lens 30 may be finely adjusted to be more suitable to the left and the right vehicle lamps 101L and 101R.

That is, the incident surface 31 of the second lens 30 used for the left vehicle lamp 101L may be finely adjusted to be a planar shape more suitable for the left side, and the incident surface 31 of the second lens 30 used for the right vehicle lamp 101R may be finely adjusted to be a planar shape more suitable for the right side.

In this way, the present invention is not limited to a specific embodiment. Modifications and improvements that do not depart from the technical aspects are also included in the technical scope of the invention, and this is evident from the description of the scope of the claims for patent.

DESCRIPTION OF REFERENCE NUMERALS

10 Lamp unit
20 Light source
21 Light radiating chip
22 Board
30 Second lens
31 Incident surface
32 Radiation surface
33, 34 Convex part
35 Recessed part
40 First lens
41 Incident surface
41*a* Central region
42 Radiation surface
42*a* Outer radiation surface
C Cone
LC Light cone
PF Basic focal point
SF Basic focal point
O Light source optical axis
LP, LP' Diffusion light distribution pattern
LP1, LP2, LP3 Light distribution pattern
LP1', LP2', LP3' Light distribution pattern
101L, 101R Vehicle lamp
102 Vehicle

The invention claimed is:

1. A vehicle lamp, comprising:
    a semiconductor light source;
    a second lens that includes an incident surface disposed on a front side of the light source, in which two convex parts projecting toward the light source at positions outside of a center in the horizontal direction are connected on the central side, and an inwardly recessed part is formed on the central side, and a radiation surface configured to radiate light incident from the incident surface to the front of the vehicle; and
    a first lens disposed between the light source and the second lens, configured to convert distribution of light from the light source into distribution of light to be incident on the incident surface of the second lens, and radiate the light from the light source at the second lens so that a diffusion light distribution pattern radiated to the front of the vehicle is extended to the outside of the vehicle in a horizontal direction, wherein
    the recessed part of the incident surface of the second lens is formed in a planar shape to perform light distribution control to form substantially the entire shape of the diffusion light distribution pattern, and
    an outer part of the incident surface of the second lens in the horizontal direction is formed in a planar shape to perform light distribution control to form a high luminosity zone on the central side in the horizontal direction of the diffusion light distribution pattern.

2. The vehicle lamp according to claim 1, wherein
    the recessed part that performs light distribution control to form substantially the entire shape of the diffusion light distribution pattern is a part located closer to the center than the positions of the two convex parts of the second lens most projecting toward the light source, and
    an intermediate part extending from an outside of the recessed part of the second lens in the horizontal direction to an inside of the outer part in the horizontal direction is formed in a shape of an incident surface to perform cross light distribution control from the recessed part side toward the outer part side so that the incident surface on the recessed part side radiates light on the outer side of the diffusion light distribution pattern, and the incident surface on the outer part side radiates light at a position near the outside of the high luminosity zone.

3. The vehicle lamp according to claim 2, wherein
the intermediate part extends over the inflection points of the convex parts, and
the outer part of the second lens is located outer than the inflection points of the convex parts.

4. The vehicle lamp according to claim 1, wherein
the outer part of the incident surface of the second lens is formed in a planar shape to perform cross light distribution control so that, sequentially from the inside to the outside in the horizontal direction, light is radiated at a high luminosity zone outer part on the opposite side across a light source optical axis from an outer part of of the high luminosity zone outer side of the light source optical axis.

5. The vehicle lamp according to claim 1, wherein
the incident surface of the second lens performs light distribution control so that the light to be radiated from the radiation surface on the central side of the second lens in the vertical direction is radiated on the lower side of the diffusion light distribution pattern, and the light to be radiated from the radiation surface on the upper and lower sides in the vertical direction of the second lens is radiated on the cutoff line side above the diffusion light distribution pattern.

6. The vehicle lamp according to claim 1, wherein
the recessed part configured to perform light distribution control to form substantially entire the shape of the diffusion light distribution pattern is a part in which light radiated from the light source at an angle equal to or larger than about approximately 15 degrees with reference to the light source optical axis in the horizontal direction is radiated through the first lens.

7. The vehicle lamp according to claim 1, wherein
the outer part of the second lens is a part in which light radiated from the light source at an angle equal to or larger than about approximately 35 degrees with reference to the light source optical axis in the horizontal direction is radiated through the first lens.

8. The vehicle lamp according to claim 1, wherein
the radiation surface of the first lens is formed in a planar shape projecting to separate from the light source, and
a part of the first lens most projecting to separate from the light source of the radiation surface is located on the side on which an angle at which the diffusion light distribution pattern extends is large.

9. The vehicle lamp according to claim 8, wherein
the radiation surface of the first lens is formed in a shape in which, with reference to the part most projecting to separate from the light source of the radiation surface of the first lens, a side on the light source optical axis has a smaller curvature than that of the side opposite to the light source optical axis.

10. The vehicle lamp according to claim 1, wherein
the radiation surface of the first lens is formed in a planar shape in which, when the light is made to be incident from the radiation surface side of the second lens, with the basic focal point of the second lens being as an origin, the focal position of the second lens in an area defined by two line segments with an angle of approximately 35 degrees in the horizontal direction with respect to the light source optical axis is shifted to the inside of the vehicle with respect to the basic focal point of the second lens as the central side of the incident surface from the outside in the horizontal direction of the central region of the first lens.

* * * * *